Nov. 3, 1953 H. H. ROBSON 2,657,661
INSULATING HATCHCOVER WITH INFLATABLE GASKET
Filed Jan. 14, 1952 3 Sheets-Sheet 3
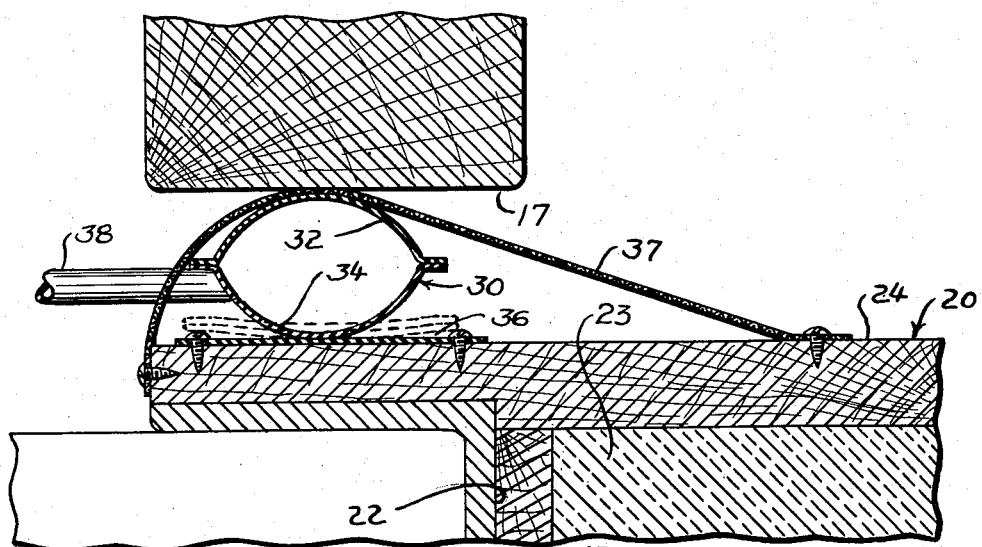
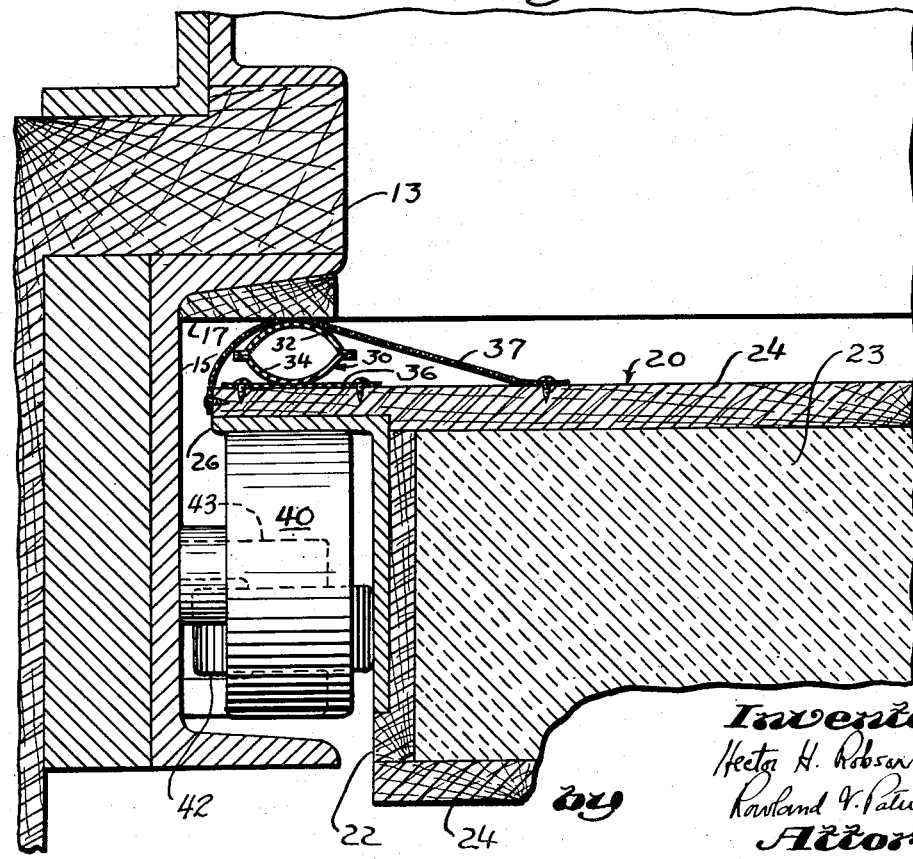
Inventor:
Hector H. Robson
Rowland V. Patrick
by
Attorney

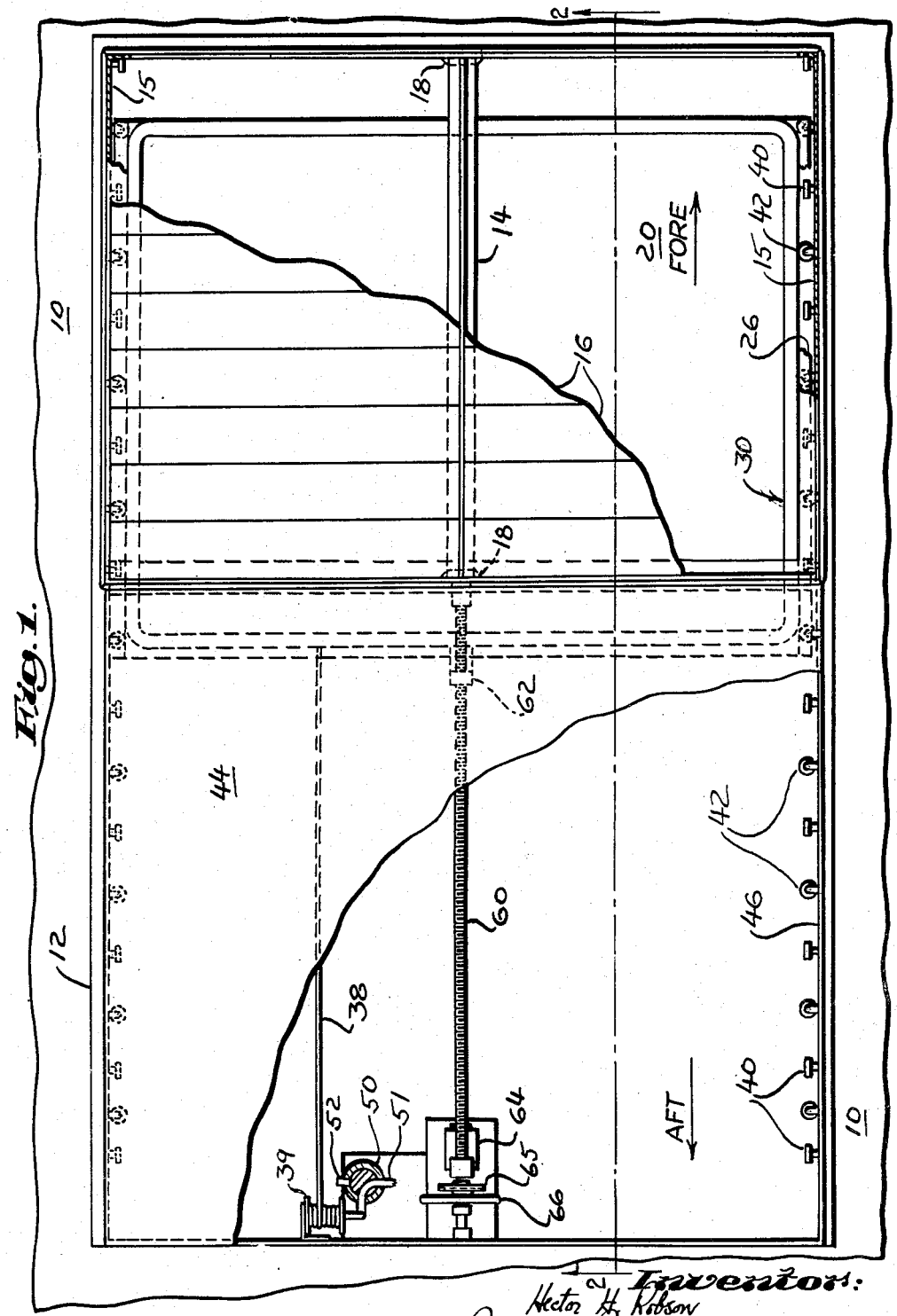

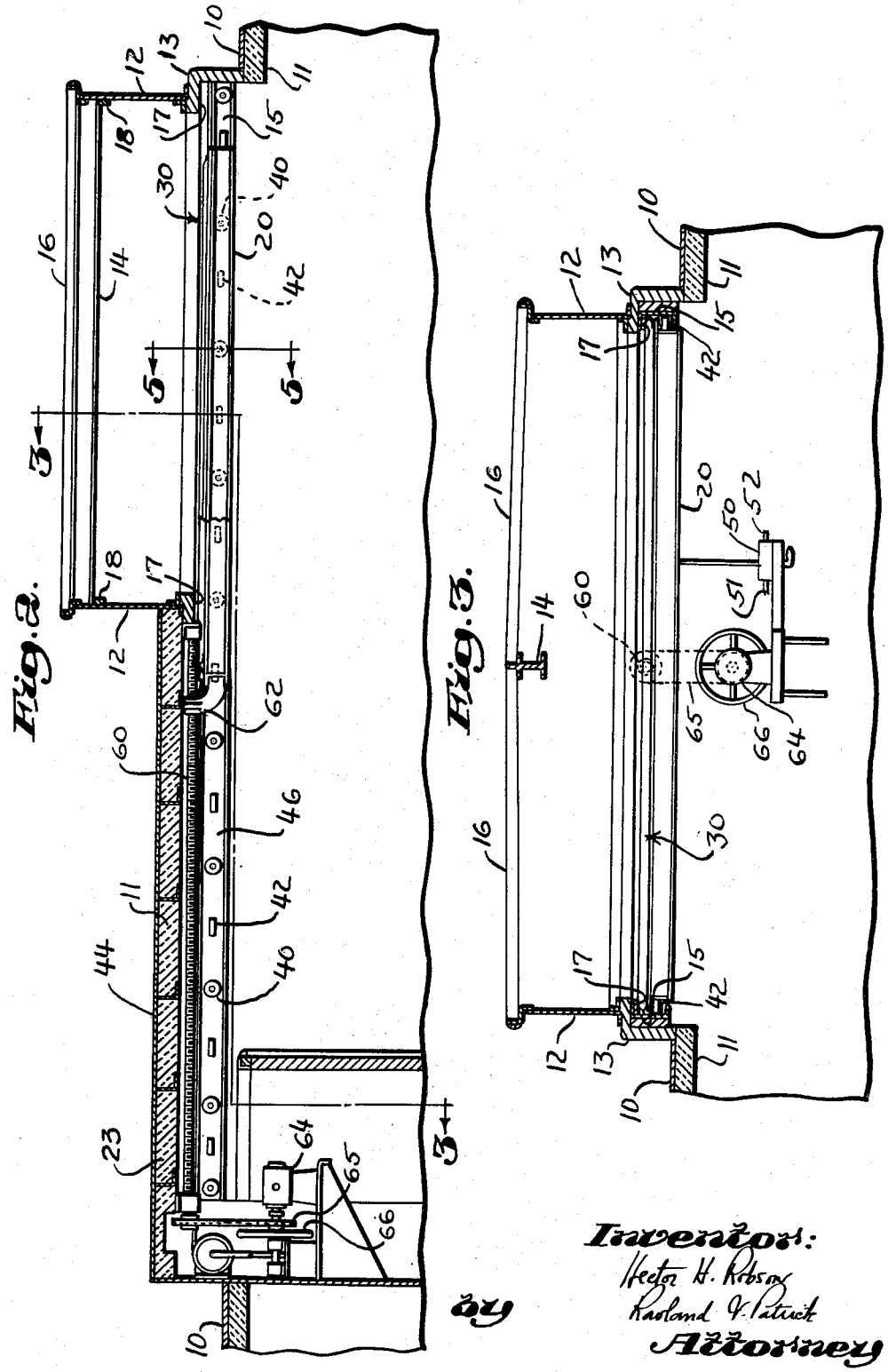

Patented Nov. 3, 1953

2,657,661

UNITED STATES PATENT OFFICE 2,657,661

INSULATING HATCHCOVER WITH INFLATABLE GASKET

Hector H. Robson, Scarsdale, N. Y., assignor to United Fruit Company, Boston, Mass., a corporation of New Jersey Application January 14, 1952, Serial No. 266,408

2 Claims. (Cl. 114—201)

This invention relates to cargo opening construction for ships and more particularly to cargo opening construction for ships having one or more insulated holds for carrying cargo which must be kept under refrigeration during the voyage.

Heretofore, in such openings or hatches, it has been the common practice to provide, below the usual weatherdeck removable hatch beams and hatch boards, a second set of removable hatch beams supporting heat insulating wooden hatch plugs. These hatch plugs were usually made in relatively small sections so that they might readily be handled, and thus a number of them were required to seal a hatch, of the order of thirty or so for a 20 by 30 foot hatch. The relatively large number of such plugs and their numerous joints precluded the desirable airtight seal at the hatch opening, resulting in air leaks through the hatch which continuously had to be made up by the ship's refrigerating plant, requiring a much larger plant than would otherwise have been necessary with a suitably sealed hatch as well as causing considerable difficulty with moisture condensing or freezing on the cargo.

Some attempts have been made to reduce such hatch air leaks by providing overlapping joints on adjoining hatch plugs, but the resulting interfitting, although somewhat helpful in reducing air leaks, did not have the desired result, and such plugs were easily damaged by the rough handling of stevedoring operations so that they become difficult or impossible to replace, as well as becoming less effective as a seal.

Furthermore, the large number of hatch plugs, as well as the removable hatch beams necessary to support them, required considerable time and labor for opening and closing a hatch, particularly when interfitting hatch plugs were used, and the hatch plugs and beams removed from the hatch as a practical matter had to be stacked on deck during the stevedoring operation and thus to some extent interfered with the loading and discharging.

Accordingly, it is an object of my invention to provide an insulating hatch cover having a novel inflatable gasket which will provide an entirely suitable air tight seal for a refrigerated hold.

It is a feature of my invention that my novel hatch cover may be of unitary construction, that is, a single hatch cover may be used to seal the entire hatch opening, thus greatly reducing the possibility of air leaks while at the same time greatly simplifying construction.

It is another feature of my invention that it entirely eliminates manual labor in opening and closing the insulated hatch, since it is mechanically operated. Furthermore, it is self-storing when in open position, thus increasing the amount of clear deck space available for the stevedoring operation.

To aid in pointing out further objects and features of a preferred embodiment of my invention, reference is made to the accompanying drawings, in which:

Fig. 1 is a plan view, partly broken away, of a ship's hatch cover of my invention;

Fig. 2 is a fore and aft cross-sectional view of the hatch of Fig. 1;

Fig. 3 is a thwartship cross-sectional view of the hatch of Fig. 1, taken on the line 3—3 of Fig 2;

Fig. 4 is an enlarged cross-sectional view of a portion of Fig. 3 showing the hatch cover supporting means and gasket sealing means thereof; and Fig. 5 is an enlarged cross-sectional view of my novel inflatable gasket as embodied in the insulating hatch cover construction of Fig. 1.

In Figs. 1, 2 and 3 is shown an insulated hold with a cargo hatch opening through a main weatherdeck structure 10 having insulation 11 thereunder to insulate the hold. The hatch opening is provided with a fixed frame member 12 extending entirely around the hatch opening, in effect surrounding and defining the hatch opening, the coaming portion of said framing member extending upwardly for two or three feet above the deck 10 in the usual manner. The lower portion 13 of said frame 12 is of inverted L shape of insulating material such as wood and adjoins main deck insulation 11 to provide a continuous insulating horizontal lower edge portion 17 on the inner periphery of frame 12. The upper portion of hatch frame 12, the coaming portion, is provided with the usual removable hatch beam 14 and hatch boards 16, the beam 14 removably fitting into sockets 18 inside opposite ends of the coaming at the upper portion thereof and serving, together with the coaming, to support hatch boards 16 in the well known manner.

According to my invention I have provided below the weatherdeck removable hatch beams and hatch boards, a one piece insulating hatch closure member or cover generally designated as 20 slidably mounted in horizontal position parallel to and at one side of the ship deck structure, such cover being adapted to be moved to one position to open the hatch and to another position to close the hatch, said hatch cover being slightly larger than the hatch opening in order to overlap the lower insulated portion 17 of the frame 12—or the hold insulation 11 adjacent thereto—in opposed juxtaposition thereto around the entire periphery thereof and having a novel inflatable gasket generally designated as 30 on its upper horizontal surface around the entire periphery thereof adapted to be inflated to seal the space or crevice between the edge portion 17 of frame 12 and hatch cover 20 when the cover is in closed position, all as hereinafter more fully explained.

The hatch cover 20 is preferably of built up insulated construction. For example, it may include frame members 22 having insulating material 23 such as mineral wool therebetween, the top and bottom surface members 24 of said hatch 20 being of plywood or the like, such construction providing a relatively light but rigid insulated one piece hatch cover 20. As most clearly shown in Fig. 4, a flange member 26 is provided along the fore and aft side edges of hatch cover 20 to support the cover 20 for sliding fore and aft movement on supporting rollers 40, said rollers being mounted for free rotation about horizontal axes in a horizontal line on each side of the lower frame portion 13 on the vertical surface 15 thereof beneath the overhanging horizontal sealing surface 17 on said frame portion which extends around the entire periphery of the hatch opening. Lateral guiding rollers 42, mounted for free rotation about vertical axes by supporting axle means 43, guide the hatch cover 20 in its fore and aft sliding movement. The vertical surface 15 on which said rollers 40 and 42 are mounted need only extend along the sides of the hatch opening though it may also extend across one end thereof as shown in the drawings. At the other end of the hatch, either the forward or aft end thereof as desired, the vertical surface portion 15 of the wooden lower edge portion 13 of the frame 12 is cut away so that the hatch cover 20 may be moved under one side of said frame 12 to open position, the main deck 10 preferably having a raised portion 44 on said side, herein designated the aft side of the hatch, said raised portion being at least as wide and as long as the hatch cover 20 to accommodate the hatch cover in open position below the main deck portion 44 without reducing the headroom in the hold as would be the case if the hatch cover were merely suspended below the main deck 10. The line of rollers 40 and 42 extends into said raised portion 44, said rollers being mounted about suitable axes on the vertical sides 46 of the raised portion 44.

In order to seal the crevice or space between the upper peripheral horizontal surface of the hatch cover and the continuous horizontal sealing surface 17 on bottom members 13, I have provided a novel inflatable gasket 30, as best shown in Fig. 4, having relatively great vertical extension to accommodate the variations in the vertical width of the crevice, such variations being due to the wide tolerances, of the order of ¼ to ½ inch, usual in ship hull construction. The gasket 30 is of three piece construction, and of a plastic material such as vinyl comprising an upper vinyl strip 32 and a lower vinyl strip 34, said strips being heat sealed together at the outer edges thereof to provide an air proof seal extending around the entire periphery of the hatch cover 20. The central portion of the lower strip 34 is heat sealed to the center of a vinyl attaching strip 36 to facilitate attaching my novel gasket 30 to the upper outer horizontal peripheral surface portion of the hatch cover, the edges of said attaching strip 36 preferably being tacked or otherwise secured to the upper plywood surface member 24 of hatch cover 20. A canvas protecting strip 37 may be tacked on hatch cover 20 to cover upper strip 32 to protect said strip from abrasion due to the opening and closing of hatch cover 20. An air line 38 provides an inlet and an outlet for the inflating air, such line 38 having a reel 39, preferably spring or weight operated, to allow it to be wound up as the hatch cover is moved. The air for inflating gasket 30 may be supplied by any suitable means, as from a compressor and tank to a two way valve 50 operative in one direction to connect the line 38 to the air supply line 51 and in the other position to an exhaust 52. I have found that relatively low air pressures of the order of 2 to 5 pounds per square inch are suitable for closing the crevice to provide an entirely suitable air seal for a refrigerated hold. My novel gasket 30 has a relatively great vertical extension as may be seen from Fig. 5 in which the gasket is shown in inflated position in solid line, yet it lies flat in uninflated position, as shown in the dotted line position of Fig. 5, allowing free sliding movement of the hatch cover 20 when the gasket 30 is deflated, the flat strips 32 and 34 of which it is made up ensuring that the gasket 30 will be sufficiently deflated when valve 50 is opened to allow the air to exhaust itself, without any necessity of exhausting the air by suction means.

My novel insulating hatch cover is opened and closed by mechanical means to eliminate manual labor, such means including an axially extended screw threaded shaft 60 rotatably mounted below raised main deck 44 and extending generally for the full length of raised deck 44 along the fore and aft center line thereof, the forward end of said screw threaded shaft being mounted adjacent the aft edge of frame 12. The hatch cover 20 has mounted on the aft edge thereof a rotatably fixed screw threaded nut 62, said nut being somewhat above the upper surface of hatch cover 20 at the center line thereof engaging shaft 60, and adapted to be moved along said shaft by rotation of the shaft, thus moving hatch cover 20. The shaft 60 is rotated by a reversible air motor 64, connected to shaft 60 by a chain drive 65, a hand wheel 66 being provided on said motor shaft to move the hatch cover 20 manually in case of motor failure.

In operation then, assuming the insulated hatch cover 20 to be in closed position, to open the insulated hatch cover it is merely necessary to operate valve 50 to deflate gasket 30 and then operate air motor 64 to rotate shaft 60, moving nut 62 aft along the shaft 60 and opening insulated hatch cover 20. To close the insulated hatch cover 20, the procedure is reversed, air motor 64 being operated to move nut 62 forward along shaft 60 until the hatch cover 20 contacts the vertical edge 15 at the forward portion of the hatch, after which time the air motor 64 may be stopped and gasket 30 inflated by turning valve 50 to connect said gasket to air line 51, both the opening and closing of said insulating hatch cover being independent of the weather deck cover. The screw threaded shaft 60 and nut 62 thereon serves to secure the hatch cover 20 against fore and aft movement unless such shaft is positively rotated by motor 64, or hand wheel 66.

It will be seen that I have provided a novel insulated ship cargo opening construction which provides a suitable air tight seal and yet one which may be opened or closed without manual labor. It will be apparent to those skilled in the art that various modifications within the spirit of my invention and the scope of the appended claims may be made therein, for example, my novel insulated hatch cover may be used through lower deck and other ship structures, as well as through the main deck structure as herein described.

I claim:

1. An insulating hatch construction for ships comprising a fixed frame member defining a hatch opening through a ship deck, said frame member having a substantially continuous horizontal lower surface portion surrounding said hatch opening, an insulating closure member for said hatch opening mounted below said ship deck for horizontal sliding movement into and out of hatch closing position, said closure member in closing position having horizontal upper surface portions in opposed juxtaposition to said horizontal surfaces of said fixed frame member, and a hollow inflatable gasket mounted on one of said members for interposition between said opposed surfaces when said closure member is moved to closing position, said gasket in said closing position of said closure member being inflatable and deflatable for sealing the spaces between said opposed surfaces.

2. An insulating hatch construction according to claim 1 in which said gasket is mounted on the upper horizontal peripheral surface portions of said closure member.

HECTOR H. ROBSON.

References Cited in the file of this patent

UNITED STATES PATENTS

| Number | Name | Date |
|---|---|---|
| 583,375 | Hood | May 25, 1897 |
| 1,653,631 | Kirkland | Dec. 27, 1927 |
| 1,777,880 | Ewertz et al. | Oct. 7, 1930 |
| 1,795,016 | Faber | Mar. 3, 1931 |
| 1,797,706 | Winslow | Mar. 25, 1931 |
| 1,877,361 | Perkins | Sept. 13, 1932 |
| 2,250,524 | Dietrichson | July 29, 1941 |
| 2,330,220 | Kemper | Sept. 28, 1943 |
| 2,360,276 | Redmond | Oct. 10, 1944 |
| 2,386,702 | McBride | Oct. 9, 1945 |
| 2,401,624 | Petter et al. | June 4, 1946 |

FOREIGN PATENTS

| Number | Country | Date |
|---|---|---|
| 539,977 | Great Britain | Oct. 1, 1941 |
| 643,448 | Great Britain | Feb. 25, 1942 |